United States Patent
Stein

[19]

[11] Patent Number: 6,010,049
[45] Date of Patent: Jan. 4, 2000

[54] CARRIER FOR A TRAILER-HITCH RECEIVER

[76] Inventor: John P. Stein, 14087 State Highway 15, Kimball, Minn. 55353

[21] Appl. No.: 08/916,850

[22] Filed: Aug. 22, 1997

[51] Int. Cl.[7] ............................... B60R 0/06; B60R 9/10; B60R 9/12

[52] U.S. Cl. ...................... 224/485; 224/521; 224/532; 224/527; 224/533; 224/534; 224/535; 224/536; 224/537; 224/924; 224/917.5

[58] Field of Search ............... 224/485, 924, 224/917.5, 521, 531, 532, 535, 533, 525, 526, 527, 534, 536, 537

[56] References Cited

U.S. PATENT DOCUMENTS

| | | |
|---|---|---|
| D. 308,846 | 6/1990 | Eckhart . |
| 1,666,507 | 4/1928 | Puffe ........................ 224/526 |
| 3,437,248 | 4/1969 | Allen . |
| 3,765,581 | 10/1973 | Kosecoff ................. 224/924 |
| 3,794,227 | 2/1974 | Stearns .................... 224/924 |
| 4,116,341 | 9/1978 | Hebda ..................... 224/924 |
| 4,406,384 | 9/1983 | Schantz . |
| 4,411,461 | 10/1983 | Rosenberg ............ 224/917.5 |
| 4,676,413 | 6/1987 | Began et al. ............. 224/924 |
| 4,676,414 | 6/1987 | Deguevara . |
| 5,330,312 | 7/1994 | Allsop et al. ........... 224/917.5 |
| 5,460,304 | 10/1995 | Porter et al. ........... 224/917.5 |
| 5,469,997 | 11/1995 | Carlson . |
| 5,476,202 | 12/1995 | Lipp . |
| 5,593,172 | 1/1997 | Breslin . |

FOREIGN PATENT DOCUMENTS 41 889   12/1981   European Pat. Off. ............... 224/924

*Primary Examiner*—Linda J. Sholl
*Attorney, Agent, or Firm*—Albert W. Watkins

[57] ABSTRACT

A vehicle receiver mounted cargo carrier is readily configured to transport bicycles, skis and poles, canoes, canoe paddles and other cargo through the use of a vertical frame into which various rods may be placed, at locations most suited for the specific cargo. Other structural components form anchor points for the cargo that also help to retain the cargo and act as theft deterrents. The carrier is designed to be free standing out of the vehicle receiver, and so may be used as a storage organizer for the cargo before, during and after transport. Prior to assembly, the components of the carrier are relatively two dimensional, so the carrier may be packaged, stocked and sold in compact, flat packaging. Alternative support struts offer additional methods of supporting the cargo.

2 Claims, 9 Drawing Sheets

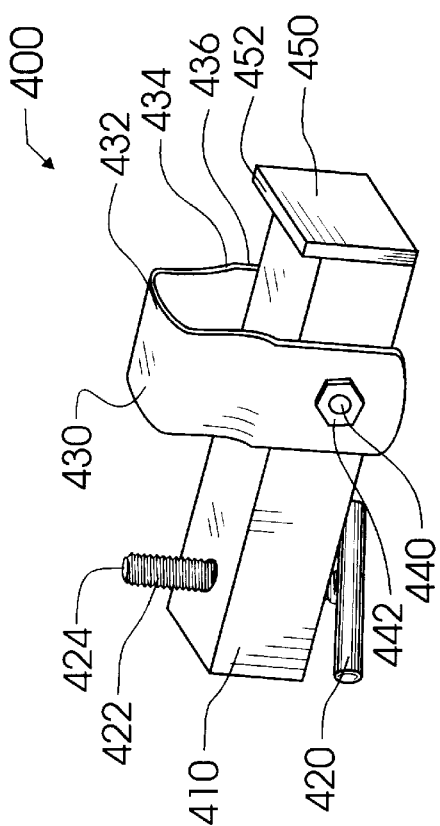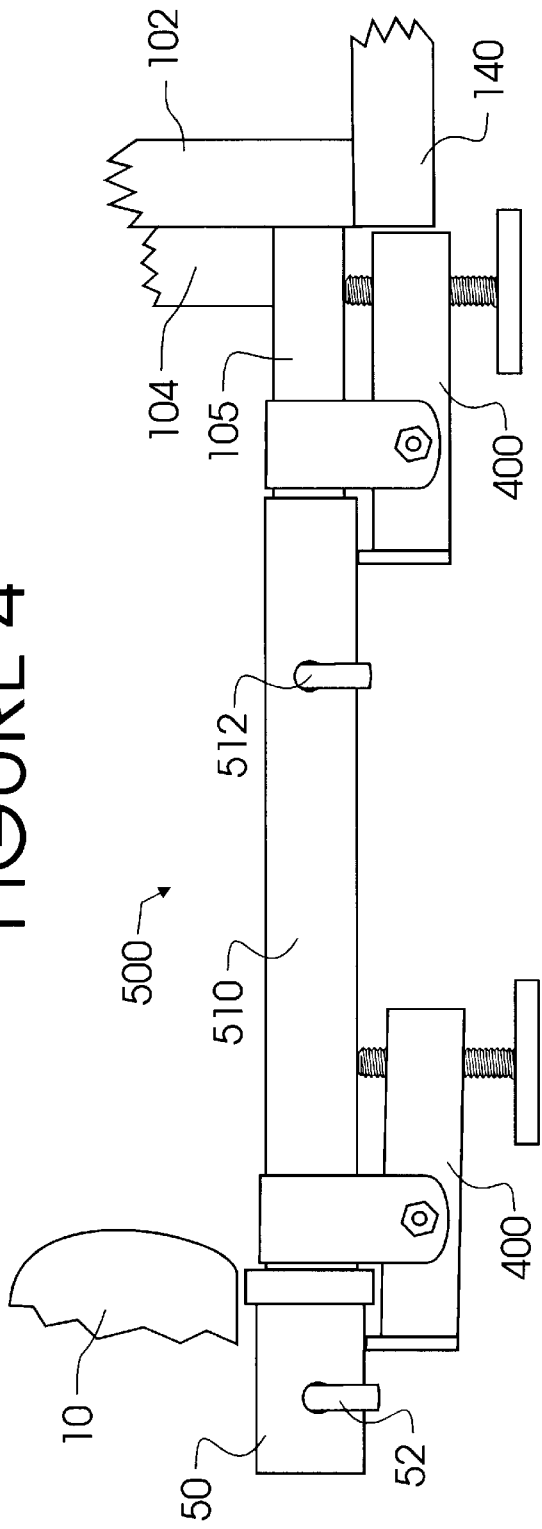

CARRIER FOR A TRAILER-HITCH RECEIVER

BACKGROUND OF THE INVENTION

1. Field of the Invention

This invention pertains to article carriers generally, and particularly to multi-purpose ski and bicycle carriers that engage a trailer type receiver hitch.

2. Description of the Related Art

Passenger vehicles are well adapted to transport people, as they were designed to do, and will readily transport small cargo such as grocery sacks and brief cases. People, however, do not always choose to rely upon passenger vehicles for transportation. During outings, such as weekend trips, vacations or competitions, other modes of transportation are often desired. Skis, canoes or bicycles may be integral to the outing. The recreational enthusiast knows the value of quiet leisure away from the hustle and bustle of the city, but must somehow find a way to carry both passengers and additional transportation equipment to the place of leisure. The competitor must get to and from the competitions, and will want to preserve the equipment for competition.

The method of transporting equipment should not detract from the goal of the outing, be it leisure or competition, nor should it cause any damage to the passenger vehicle. Unfortunately, in the past these simple goals have each been contrary to each other. A multitude of roof-top racks and carriers have been designed for either permanent or temporary mounting. These carriers are usually designed and manufactured to be compatible with one or a limited number of vehicles, since each vehicle is sized and shaped uniquely.

While the permanent variety usually are more reliable in load carrying, they are also usually installed at the factory to carefully control installation and thereby prevent any leakage or damage which might otherwise occur. Moreover, they permanently add to the size of the vehicle, and also generally detract from the vehicle's appearance.

Temporary carriers have been designed from diverse materials and geometries, including materials such as foam block, foam pad, rubber, plastic, metal and wood. To reduce the inventory required by a vendor to sell the temporary carrier, common vehicle features are used to attempt to provide the necessary support for cargo. For example, gutters are often found around vehicle doors, and a number of carriers clamp onto these gutters. Unfortunately, not all vehicles have features such as gutters, and so several different carriers must still be designed. Other carriers rely on the roof of the vehicle to provide both load bearing and also a place for friction, suction or magnetic grab. These temporary carriers have a tendency to be more temporary than planned or desired, occasionally allowing the cargo to slip and either be damaged or damage the vehicle. Such an event is totally unacceptable and will render a carrier useless.

In addition to the other challenges, roof-top carriers present an obstacle during loading and unloading. The equipment must somehow be placed on top of the vehicle without damaging either the vehicle or the equipment. Yet, the reason the equipment is being placed on top of the vehicle is because of large size and/or great bulk.

Other prior art carriers have been designed to mount on the bumper of a vehicle. While this type of carrier is often easier to load and unload, the limitations related to different vehicle designs found with the roof top carriers are still present. Different vehicles have different bumper designs. Some of the most modern vehicles offer no access to the bumper at all, and so different carriers must still be designed and stocked to accommodate different vehicles.

Given the limitations of the prior art, it is not surprising that there has been a relative explosion in carriers designed to install directly into a hitch receiver. The hitch receiver acts as a universal coupling into which utility and boat trailers may be attached, and may also be used to support a carrier. Like the bumper carrier, a hitch receiver carrier provides the advantage of easy equipment loading. In addition, hitch receivers have become standard to two sizes. The large size, a two inch receiver, is designed for high loads and may be specified, for example, for trailers as large as 3,500 pounds and tongue weights as great as 350 pounds. For smaller loads, typically up to 2,000 pounds and tongue weights of 200 pounds, a one and one-quarter inch hitch receiver is used.

While the hitch receiver designs have vastly eased the problems of different vehicle designs, there are still limitations therein that manufacturers have not been able to satisfactorily address. One limitation is the variability of equipment a user will transport. Some manufacturers have addressed each different type of equipment with different add-on components which adapt the carrier to the particular equipment. Unfortunately, a store then has to stock each of the different components. The user will also have to store all of the unused components, and remember the intended purpose of each of the components. Obviously, making the carrier adaptable to a variety of cargo is an expensive proposition for all involved, and is therefore undesirable when such add-ons are required.

Another problem with hitch receiver carriers is when they support relatively large loads. The carrier is on a long arm extending from the receiver. When acceleration occurs in a vertical direction, the receiver is carrying the load exactly as it was designed for. Unfortunately, events such as acceleration, bumps and cornering lead to forces which are not always directly vertical. Particularly with the long vertical arm, forces transverse to the vehicle are amplified at the hitch. The carrier may sway or pivot undesirably within the receiver. Furthermore, even with purely vertical forces, the carrier may rattle or chatter within the receiver. Finally, there are two different standard receiver sizes that must be accommodated.

Some prior art carriers are illustrated in U.S. Pat. No. 3,437,248 to Allen, U.S. Pat. No. 4,406,384 to Schantz, U.S. Pat. No. 4,676,414 to Deguevara, U.S. Pat. No. Des. 308,846 to Eckhart, U.S. Pat. No. 5,469,997 to Carlson, and U.S. Pat. No. 5,476,202 to Lipp, the contents and teachings of each incorporated herein by reference. The Allen patent was one of the early patents which showed a multi-purpose carrier that included bicycle, ski and roof-top capability. Like many of the other subsequent patents, however, the Allen design is limited to one or two bicycles, provided the bicycles are of the right design, or, alternatively, two pairs of skis. Bicycles of unusual design, or other objects aside from the skis, are not as easily accommodated, nor are multiples of bicycles and skis.

Schantz discloses a bumper mounted carrier that includes a cargo area behind the vehicle and also on the roof-top. The Schantz design does not include adaptations for any particular type of load, but does illustrate a dual platform carrier.

Deguevara illustrates a receiver mounted bicycle carrier, with a separate attachment for carrying skis. The Deguevara patent illustrates some of the fundamental limitations discussed previously. The carrier is limited to a predetermined number and type of bicycles, two as illustrated, and requires additional hardware, purchased separately, to accommodate skis. Other equipment would require yet more hardware.

Eckhart discloses an elegantly simple bicycle carrier using rods that are inserted using cotter pins. Unfortunately, no provisions are made for other types of cargo aside from bicycles. Carlson discloses a different, yet also well devised, bicycle carrier. Unfortunately, like the Eckhart design, no provisions are made for other cargo.

Lipp discloses a bicycle and ski carrier which is capable of transporting several pairs of skis or bicycles without requiring separate add-on components, but the Lipp design is limited to carrying one type of cargo at a time, wherein the cargo must be consistent. In other words, either skis all having the same approximate thickness or bicycles having frame pieces of approximately the same diameter and having appropriate shape and dimension will fit onto the carrier, but not both simultaneously.

The prior art limitations on adaptability are particularly apparent when a larger number of bicycles, such as six, are desirably transported, particularly when those bicycles may include racing bicycles, bicycles without a top bar between seat and handle bars, and racing bicycles which may not have openings within the frame structure at all. Other difficult combinations are various assortments such as skis and bicycles or other combinations of diverse equipment.

SUMMARY OF THE INVENTION

These and other limitations of the prior art are overcome in the present invention, which in a first manifestation comprises a cargo carrier having a first support extending in a vertical direction and having a first transverse hole and a second hole vertically displaced from the first hole but also in and transverse to the first vertical support; a second support extending in a vertical direction and having a third transverse hole and a fourth hole vertically displaced from the third hole but also in and transverse to the second vertical support; a third support horizontally spacing the first support from the second support; and a hitch means for securely engaging a vehicle receiver that is mechanically interconnected to and supports the first, second and third supports.

In a second manifestation of the invention, an adaptable carrier for skis, ski poles, bicycles, snow boards, surf boards, canoe paddles and other cargo comprises means for releasable interlocking with a vehicle; means for supporting a load coupled to the interlocking means and extending vertically therefrom, a plurality of means for engaging with the cargo releasably coupled to the load supporting means and extending primarily horizontally therefrom, the plurality of engaging means releasably attachable to the supporting means at a plurality of both horizontally and vertically different locations to securely engage various cargo.

In a third manifestation, the invention comprises a trailer hitch carrier that can be attached to a motor vehicle trailer hitch receiver and supported thereon, which more specifically comprises a carrier hitch insertable within the motor vehicle trailer hitch receiver; a first vertical strut extending vertically from the carrier hitch and having tie points thereon; a bicycle support strut having thereon means for supporting a plurality of bicycles; a receiver for releasably receiving and supporting said bicycle support strut therein mounted adjacent to the first vertical strut; a first horizontal strut adjacent but perpendicular at a midpoint to the first vertical strut and transverse to said carrier hitch, the first horizontal strut having a plurality of holes therethrough; a second vertical strut adjacent one end of the first horizontal strut but perpendicular thereto, and having a plurality of holes therethrough; a third vertical strut adjacent but perpendicular to a second end of the first horizontal strut and also having a plurality of holes therethrough; and a plurality of rods extending from and repeatably removable from some of the holes in the second and third vertical struts.

In another manifestation, the present invention comprises a spring-loaded retractable support comprising a guide tube; the support extending through the guide tube and having at a first end a hand-manipulatable means for displacing the support along a first axis in a first direction, the support having at a second end a first means for locking the support to prevent displacement of the support along the first axis in the first direction; spring means for applying a force to the support along the first axis in a second direction opposed to the first direction; and a second means for locking the support to prevent displacement of the support along the first axis in the second direction.

OBJECTS OF THE INVENTION

A first object of the present invention is to provide an adaptable carrier which can accommodate very diverse articles including bicycles of all types, skis and poles, and many other articles, without requiring separate apparatus for each type of article. A second object of the invention is to be able to load and unload diverse articles without risk of damage to vehicle or articles. Another object is to be able to use the carrier as a storage organizer when not in use within a receiver hitch, thereby reducing storage space required for both the articles and the carrier. A further object is to provide either self-supporting or hanging storage. Yet another object of the present invention is to use components which are readily re-usable, and which simultaneously allow the carrier to be shipped in relatively flat and compact packaging cartons prior to resale. These and other advantages are achieved in the preferred and alternative embodiments of the invention, which are described hereinbelow in conjunction with the drawing figures. To keep the drawings as legible as possible, while still clearly identifying unique features, identical features have not been renumbered in the figures subsequent to FIG. 1, except for reference and bearing purpose, and will be understood to be the same as those of FIG. 1.

BRIEF DESCRIPTION OF THE DRAWINGS

FIG. 4 illustrates a preferred embodiment of a hitch receiver lock from a projected view, and FIG. 5 illustrates one application of the hitch receiver lock, in an alternative embodiment, from a side view.

DESCRIPTION OF THE PREFERRED EMBODIMENT

Figure 1:
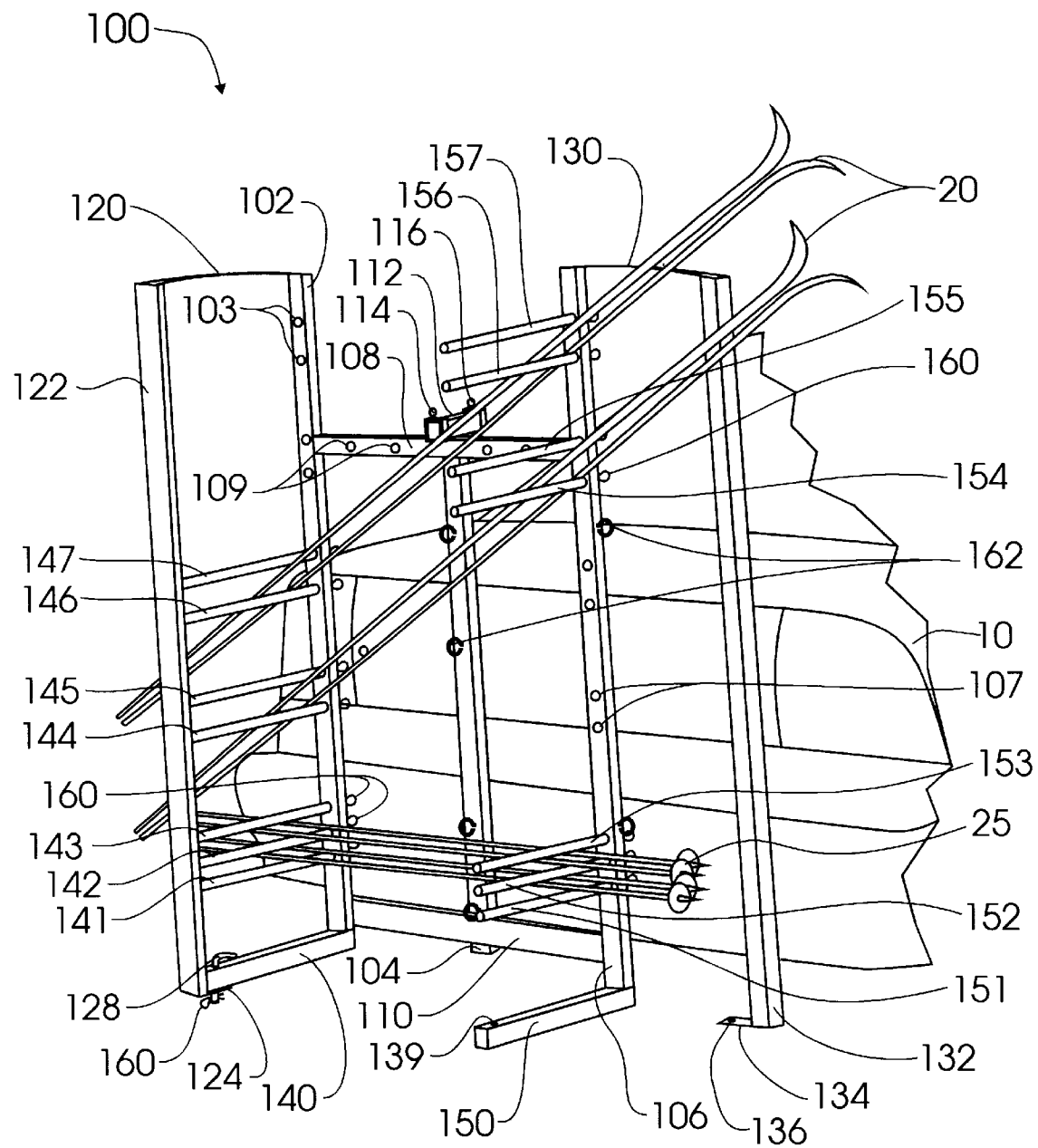
FIG. 1 illustrates the preferred embodiment of the invention, configured to carry skis and ski poles, from a projected view.

FIG. 1 illustrates the preferred embodiment carrier 100 generally. Carrier 100 is supported by vehicle 10, and is configured to carry thereon skis 20 and ski poles 25. Carrier 100 is comprised by two major vertical struts 102 and 106. Driver side vertical strut 102 has a number of holes 103 therethrough, extending longitudinally with vehicle 10. Eleven holes 103 are illustrated, but the exact number, placement and orientation of holes 103 is not critical to the invention. Holes 107 extend through vertical strut 106 and are preferably similar to holes 103 in both size and placement. Most preferably, vertical struts 102 and 106 are manufactured to be the same, for reasons to be described hereinbelow. Extending between vertical struts 102 and 106 are horizontal struts 108 and 110. Horizontal strut 108 also has holes 109 therein, preferably similar to holes 103 also. Spaced midway between vertical struts 102 and 106 is vertical strut 104. While vertical strut 104 is not essential to the working of the invention, several advantages favoring inclusion will be apparent hereinbelow. At the top of vertical strut 104, above horizontal strut 108, is receiver 112 having set screws 114 and 116 on each end. Set screws 114, 116 may be any known type, though in the preferred embodiment they arc illustrated as thumb screws.

The combination of vertical struts 102, 104, 106 horizontal struts 108, 110, and receiver 112 form the basic frame of carrier 100, from which a very large number of variations of carrier configurations are possible. Other components are added and moved around about this basic framework, depending upon the cargo to be carried, the type of vehicle 10, and the type of vehicle receiver 50 (visible in FIG. 5). By virtue of the basic frame being flat and the other components being removable and relatively two dimensional, carriers in accord with the present invention may be packaged for shipping, stocking and resale in a flat, compact package.

While not absolutely critical to the invention, the basic materials used in the preferred embodiment are square steel tubes. These tubes offer low cost, low weight, ready machinability and high strength, while the square geometry prevents unwanted spinning or rotation between different sections of tubing. Round tubing, while workable, will suffer from unwanted wear at the retaining pin holes, since those holes are the only point where relative rotation will be stopped. Moreover, the flat surfaces of square tubing ensure ready placements and alignments that are not available with round tubing. For example, with round tubing, aligning holes through which a pin must pass can be vexing. When a designer elects to change materials, the attachment methods referred to throughout the specification will need to be adapted according to the characteristics of the new materials, as is known generally.

As configured in FIG. 1, rods 141–147 and rods 151–157 are inserted through holes 103 and 107, respectively, and retained therein by cotter pins 160. Most preferably, rods 141–147 and 151–157 have a diameter larger than holes 103, 107, 109, except at the end which passes through the holes. The increased diameter may be obtained by a number of methods, such as wrapping a majority of the rod with cushioning foam or other coatings. As an alternative, a rod may be machined or produced to have different diameters at opposite ends. In the preferred embodiment, cushioning foam is used adjacent hole 103. Rod 141 is inserted through hole 103 until the cushioning foam is pressed against hole 103 to retain rod 141 at a first side of hole 103. Then cotter pin 160 is inserted into the rod, thereby retaining the rod at the second side of hole 103.

Rods 141–147 do not need to be inserted into exactly corresponding holes 103 as rods 151–157 are inserted into. As shown in FIG. 1, rods 141–143 are inserted into holes 103 at the same heights as rods 151–153 are inserted into holes 107. However, rods 144–147 are inserted into much lower holes 103 than rods 154–157, allowing skis 20 to be carried at an incline to the ground, while poles 25 are carried horizontally. The particular holes 103, 107, 109 used will depend upon the particular cargo to be carried. At various locations along struts 102, 104, 106, 108, 110 eye bolts 162 are placed, to allow tie straps, bungee cords, ropes or similar retaining devices to be used to assist in retaining cargo. While eye bolts 162 are illustrated, they are not critical to the invention and other known attachment points or retaining methods may be used.

In addition to eye bolts 162, additional cargo securement may be provided by attaching additional locking frames. A smaller square tube on the end of longitudinal strut 120 is inserted into vertical strut 102. Strut 120 is terminated at a second end by vertical strut 122. At an end opposite strut 120, vertical strut 122 terminates with small plate 124 having a hole therein, through which pin 128 is inserted and held in place by cotter pin 160. Struts 120 and 122 combine with bottom longitudinal strut 140 and vertical strut 102 to form a cage around the cargo. In this embodiment the cargo includes skis 20 and ski poles 25. If bicycles were included and were to be locked in, padlocks or trailer hitch pins of the locking type could readily be substituted for pins 128. Then the bicycles would not need to be individually locked. In the preferred embodiment, bottom longitudinal strut 140 is actually a right angle bar, with holes at each end. Through the first end, pin 128 is inserted. Through the second end of strut 140, rod 141 is inserted. Strut 140 extends vertically inside of strut 102, and has a hole matching with one of holes 103. As is apparent, bottom longitudinal strut 140 is optional, and may be used with or without the remaining locking frame formed by struts 120 and 122.

Extending from vertical strut 106 is longitudinal strut 130. As shown in FIG. 1, longitudinal strut 130 has been inserted within vertical strut 106 in a transverse direction. This is not the operative position, but it is a convenient position while cargo is being loaded and unloaded. Both longitudinal struts 120 and 130 may be arranged during cargo loading to be transverse to vehicle 10. Once cargo loading is completed, then struts 120 and 130 are lifted from struts 102 and 106 respectively, and replaced therein in longitudinal position as shown, for example, in FIG. 2. Vertical strut 132, small plate 134 and hole 136 are of similar construction and geometry to vertical strut 122, small plate 124 and hole 126 (not visible), respectively. Bottom longitudinal strut 150 is constructed similarly to bottom longitudinal strut 140. Vertical struts 122 and 132 may also have holes similar to holes 103 that extend either partially or completely therethrough, coaxial with rods 141–147 and 151–157, but this is not necessary. Whether to include holes will be dependent upon the specific construction preferred for a given application and cost.

Figure 2:
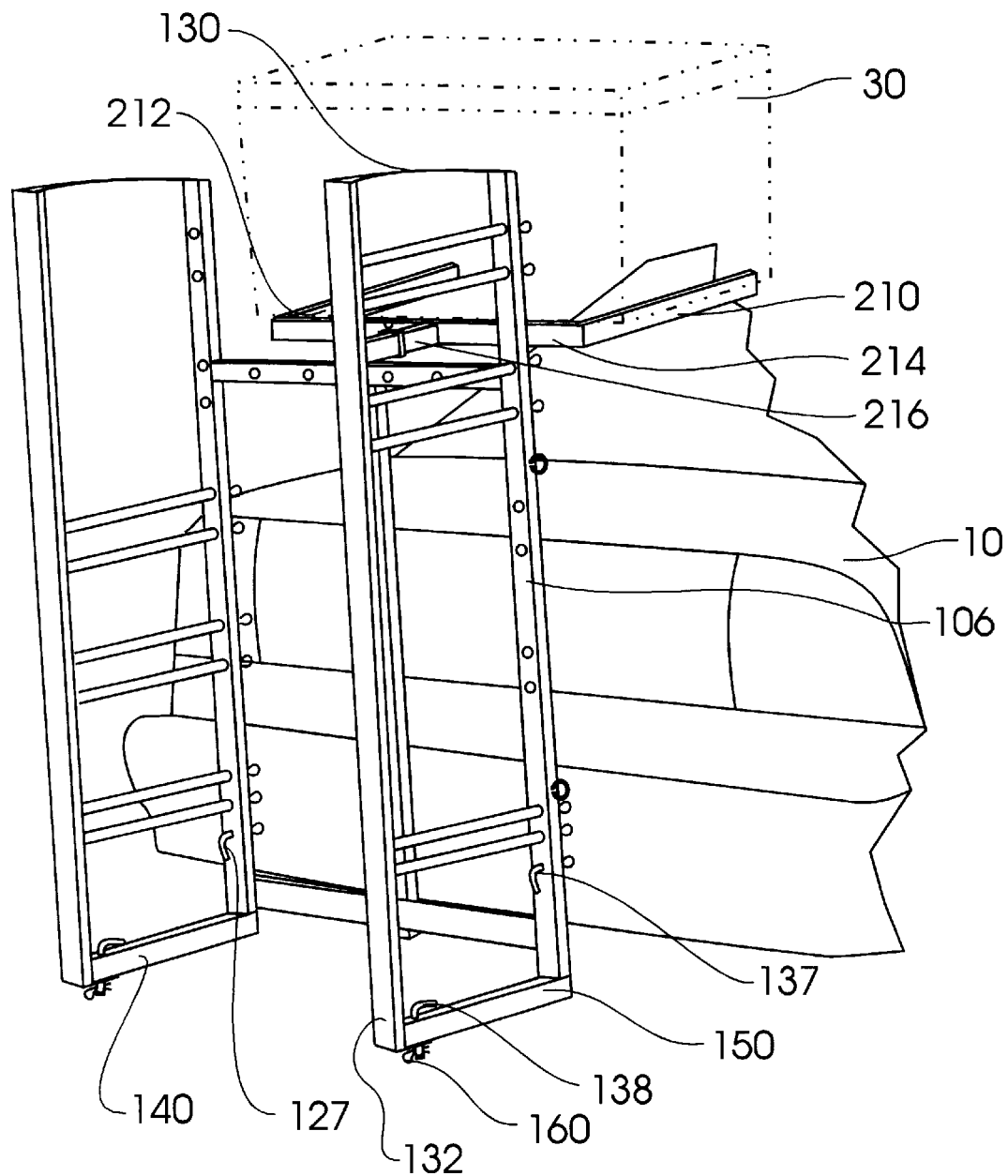
FIG. 2 illustrates an alternative embodiment of FIG. 1, with an additional cargo carrier, from a similar projected view.

Through hole 136, and through hole 139 in bottom longitudinal strut 150, pin 138 may be inserted, as shown in FIG. 2. Also visible in FIG. 2 are pins 127 and 137. In this FIG. 2 first alternative embodiment, rods 141 and 151 have been removed, and so pins 127 and 137 are necessary to retain bottom longitudinal struts 140 and 150.

Figure 11:
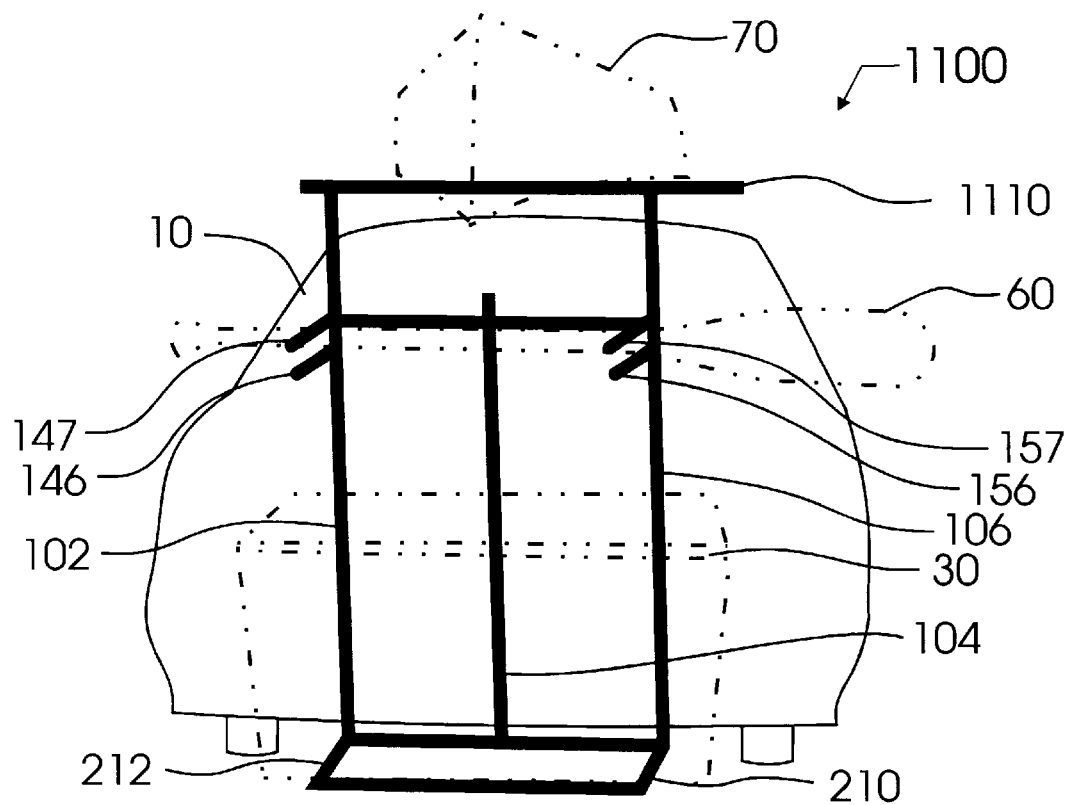
FIG. 11 illustrates a fifth alternative embodiment carrier, in accord with the invention, by schematic view.

FIG. 2 also deviates from FIG. 1 by illustrating how an additional cargo carrier 30 might be located above the trunk of vehicle 10. Carrier 30 is supported by a wishbone-shaped carrier assembly comprising longitudinal cargo struts 210 and 212, transverse strut 214 and hitch strut 216. While longitudinal cargo struts 210 and 212 are shown bridged only by transverse strut 214, a number of other combinations are suitable and understood to be included. For example, FIG. 11 schematically illustrates a full square. Screens, expanded metal, plate or other similar structure may also be added to serve as a base for carrier 30.

Figure 3:
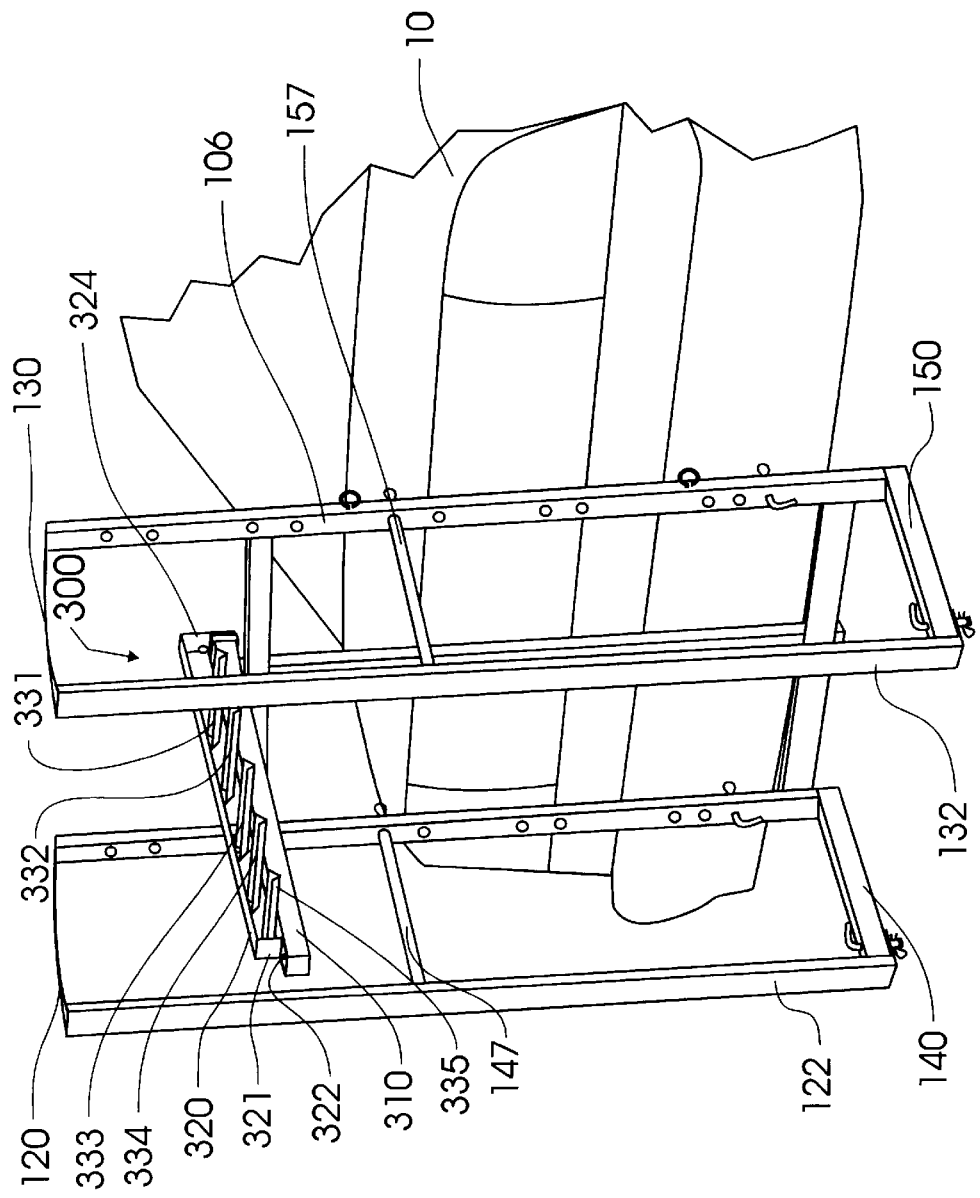
FIG. 3 illustrates a second alternative embodiment of FIG. 1, configured to carry several different types of bicycles, from a similar projected view.

FIG. 3 illustrates a second alternative embodiment which is still very similar to the embodiments of FIGS. 1 and 2. In FIG. 3, carrier 300 is configured to transport bicycles as the primary cargo. Rods 141–146 and 151–156 have been removed and placed in storage. A small tube or sack is all that is required to store the rods and cotter pins, due to their compact and simple geometry.

Extending through receiver 112 is longitudinal bicycle support strut 310. Attached to strut 310 are a number of v-shaped bicycle tube guides 331–335. While five are illustrated, any number are acceptable, so long as the capacity of vehicle receiver 50 is respected. A bicycle may be loaded with the center bar spanning across a single tube guide, and with the bicycle wheels through rods 147, 157. Once struts 120, 130 are placed and locked, carrier 300 will act as a lock for any and all bikes carried thereon.

Many additional combinations are possible and should become more apparent through review of the remainder of this disclosure. For example, when all bicycles have a horizontal bar from seat to handle bars, rods 147 and 157 may be removed and stored. Struts 120, 122, 140 and 130, 132, 150 may also be removed and stored. However, when some of the bicycles do not have the horizontal bar, rods 147 and 157 are necessary, and tube guides 331 and 332 will not be used. Struts 120, 122, 140 and 130, 132, 150 are then optional in that configuration.

Tube guides 331–335 may be affixed by any suitable method such as riveting, bolting, or gluing, but welding is used in the preferred embodiment. Inserted within support strut 310 at the end adjacent receiver 112 is a small rectangular tube securely attached to strap end section 324. Continuing from strap end section 324 is strap 320, vertical strap section 321 and strap locking surface 322. During loading, strap 322 is removed from the proximity of guides 331–335. Then, after all bicycles are loaded, strap 320 is placed over the top of guides 331–335, to prevent vibration and bumps from disrupting bicycle placement. Locking surface 322 has a hole therethrough which aligns with a corresponding hole in strut 310. If desired, a lock may be attached through the hole to act as additional theft deterrent.

FIG. 4 illustrates a hitch receiver lock 400 that is used to prevent relative motion between a hitch receiver and carriers such as carrier 100 or carrier 300. Hitch receiver lock 400 will also have utility with other types of hitches that fit within or about a hitch receiver, whether these hitches are attached to a carrier, boat, trailer or other device. Hitch receiver lock 400 has a lever arm 410 which serves as a main structural support for the remaining components, as well as acting as a lever to multiply forces. Arm 410 may be solid, tubular, U-shaped or other geometry. While material is not critical ordinary mild steel or carbon steel has been found to work satisfactorily. Extending through arm 410 at one end thereof is hand screw 420, having threads 422 and a protruding tip 424. Tip 424 may be manufactured to have a variety of geometries and may be made from or coated with a multitude of special materials which are known to benefit the present application.

At the end of arm 410 opposite hand-screw 420 is force plate 450 having active edge 452. Between force plate 450 and hand screw 420, but closer to force plate 450, is retention strap 430. Retention strap 430 has a flat surface 432 which bends sharply to flair 434, and gently widens to strap section 436. Within strap section 436 is a small hole through which bolt 440 may pass, and be held at the end by nut 442.

The operation of hitch receiver lock 400 will be more apparent from a review of FIG. 5, which illustrates one application. Therein, receiver extension 500 includes a tube 510. which is most preferably a square steel tube having holes near each end. At one end, tube 510, which might for example be two inch square tubing, is inserted into vehicle receiver 50 and retained there by hitch pin 52. To prevent unwanted rattle, vibration, torque and wear between tube 510 and receiver 50, hitch receiver lock 400 is slipped onto tube 510 such that tube 510 is surrounded by strap 430 and lever arm 410. Lock 400 is further positioned so that active edge 452 of force plate 450 is pressing against receiver 50. Then hand screw 420 is turned until tight, with protruding tip 424 pressing tightly against tube 510. By so doing, the lever arm 410 multiplies the force on tip 424 by the ratio of the length from bolt 440 and hand screw 420 to the length from bolt 440 to force plate 450. In other words, if the bolt 440 is twice as far from hand screw 420 as it is from force plate 450, then the force on active edge 452 will be twice the force on tip 424. By multiplying the force this way, it is relatively easy for a person to very securely clamp down and lock tube 510 to receiver 50.

At the other end of tube 510, carrier hitch 105 is inserted into tube 510 and pinned by hitch pin 512, but not until after lock 400 has been slipped thereon. Carrier hitch 105 may only be one and one-quarter inch tubing, which would ordinarily not stay within tube 510 without severely damaging both tube 510 and hitch 105. However, by tightening down lock 400, hitch 105 will be securely retained without damage.

As is apparent, both active edge 452 and tip 424 will be exposed to substantial forces. For applications which might demand greater strength, anti-slip characteristics, abrasion resistance, anti-marring and other special characteristics, there are well-known geometries and coatings which are considered to be incorporated herein with the present invention. Such special materials and coatings are not strictly limited to active edge 452 and tip 424 either. For example, arm 410 may include nylon within the threaded region through which threads 422 pass, to prevent accidental loosening thereof, and strap 430 may be made from or coated with a variety of materials to prevent marring or for other benefit. Such selections of materials will be considered to be incorporated into the present invention in light of the present teachings. As will become apparent in reference to FIG. 6, there are many more applications for hitch receiver lock 400 than just with vehicle hitches.

Figure 6:
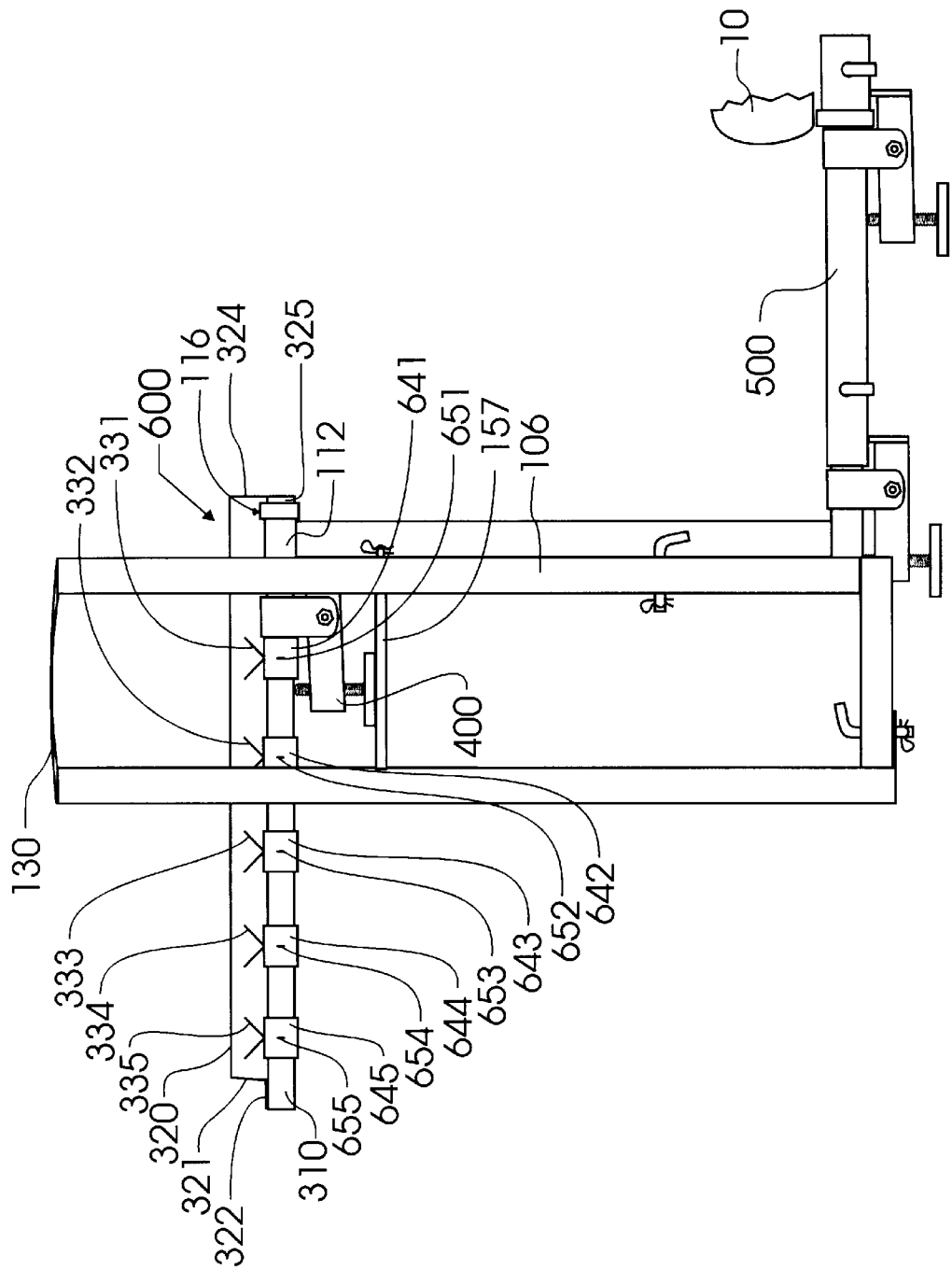
FIG. 6 illustrates a third alternative embodiment, similar to FIG. 3, from a side view in combination with the hitch receiver lock and extension of FIG. 5.

FIG. 6 illustrates an alternative bicycle support 600, an additional application for receiver lock 400, and an application for receiver extension 500. As can be seen therein, the use of receiver extension 500 results in a shift of carrier 100 away from vehicle 10. When vehicle 10 is a station wagon, mini-van or other vehicle that may require access through the rear of the vehicle, such a shift would be highly desirable, and, clearly, achievable. Receiver lock 400 may also be used in conjunction with receiver 112, more firmly affixing longitudinal bicycle support strut 310 into receiver 112. Particularly where many bicycles are carried, lock 400 provides additional securement beyond that provided by set screw 116.

Alternative bicycle support 600 resembles the bicycle support illustrated in FIG. 3, and like components have been numbered the same. Visible in FIG. 6 for the first time is small insert 325 which is attached to strap end section 324 for inserting into longitudinal bicycle support strut 310. However, rather than mounting bicycle tube guides 331–335 directly onto strut 310, they are mounted onto adjustable slides 641–645 that each have a set screw 651–655. In practice, since different bicycles require more or less space, adjustable slides 641–645 may be slid along strut 310—to achieve any desired spacing between bicycles. Once positioned, set screws 651–655 are then tightened to firmly anchor each bicycle. For example, as shown in FIG. 6, slide 641 has been positioned to accommodate lock 400, while slide 642 has still been positioned away from slide 641.

Also visible in FIG. 6 is a carrier configuration that will accommodate different style bicycles. Some bicycles do not have a longitudinal horizontal bar extending between the seat and handle bars. Since this is the bar that would rest in tube guides 331–335, another way of supporting the bicycles must be provided. Rods 157 and 147 provide the necessary support for these alternative bicycles.

Figure 7:
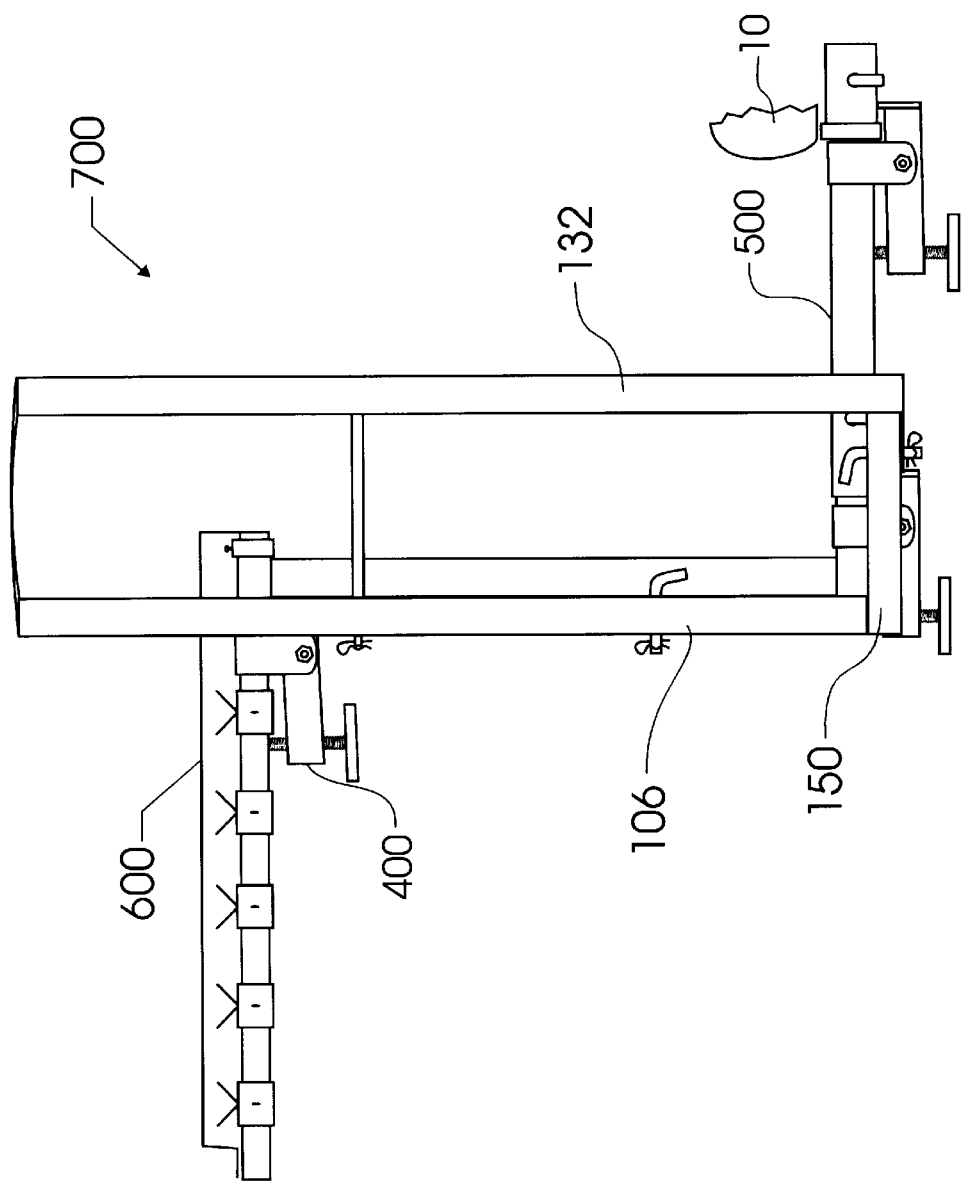
FIG. 7 illustrates a fourth alternative embodiment, similar to that shown in FIG. 6, from side view.

FIG. 7 illustrates fourth embodiment carrier 700. Carrier 700 may be used to carry a large number of bicycles and additional cargo. As shown in FIG. 7, carrier 700 might be used to carry five or more standard bicycles on bicycle support 600, and several additional bicycles between struts 106 and 132. Due to the weight of all of the bicycles, this alternative embodiment carrier 700 would only be desirably used with vehicle receivers rated for the high tongue weight, such as the standard two inch receivers. To form carrier 700 by rearranging the basic components of FIGS. 3 or 6, bottom longitudinal struts 140 and 150 must be reversed 180 degrees within vertical struts 102 and 106. respectively, so that struts 140, 150 each extend from struts 102, 106 towards vehicle 10, where in the other figures struts 140, 150 extend away from vehicle 10. Similarly, in carrier 700, vertical struts 122, 132 and longitudinal struts 120, 130 will also be reversed to extend towards vehicle 10.

In some localities, and depending upon dimensions selected for construction of an embodiment of the present invention, the length transverse to vehicle 10 from vehicle 10 in a rearward direction may exceed statutory limitations. In such instances, the user may need to attach a lighting kit thereto as is well known in the trailering art. The exact construction or placement of such lighting is not critical to the present invention, and will be understood to include variations known in the illumination art.

Figure 8:
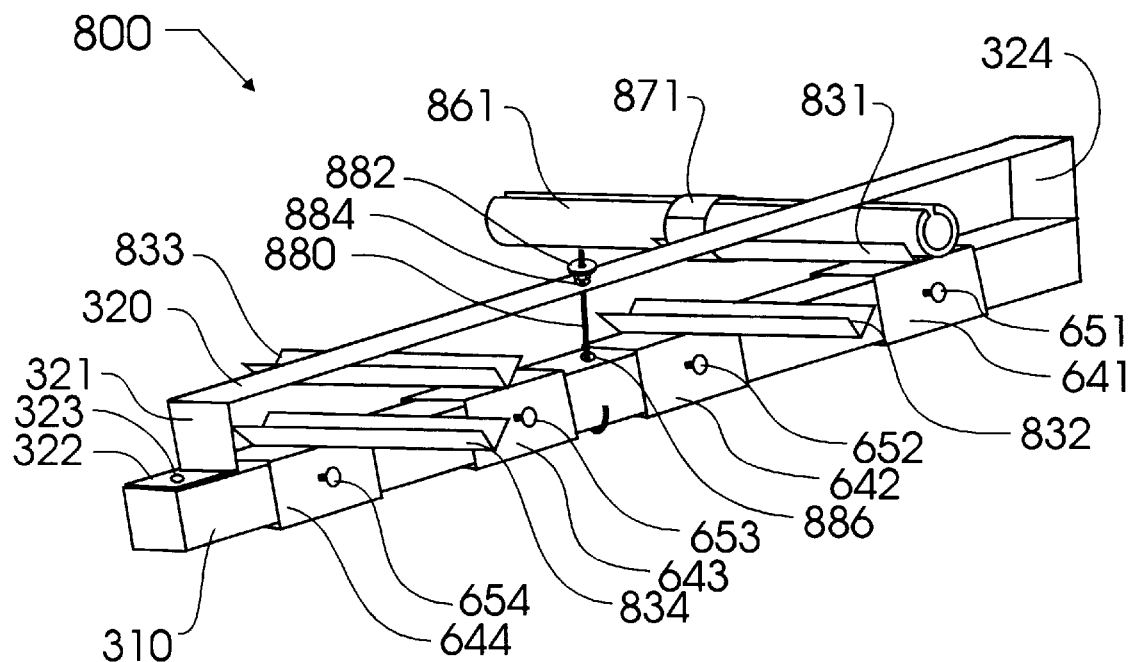
FIGS. 8 and 9 illustrate by projected view a second embodiment of the bicycle carrier components of the preferred embodiment.

FIG. 8 illustrates a second alternative bicycle support which is similar to bicycle support 600 and so is like numbered. For the first time, locking hole 323 is visible, through which a lock may be inserted to provide a theft deterrent while simultaneously anchoring the bicycles. When there is no threat of theft, a simple hitch pin may be used. Also visible are staggered, or alternating offset tube guides 831–834. While four tube guides are illustrated, it is apparent that any desired number may be used. By staggering the tube guides 831–834, bicycles may be positioned with less interference between pedals and handle bars. To further tighten bicycles into tube guides 831–834, a threaded hook 880 may be used. Hook 880 is designed to hook around two surfaces of longitudinal bicycle support strut 310 and pass through hole 886. Hook 880 spans the small gap between strut 310 and strap 320 and then passes through a hole 884 in strap 320, finally terminating in threads onto which bolt 882 is attached. By tightening down bolt 882, strap 320 may be used to more tightly support bicycles within cushioning foam 861. In addition, cushioning foam 861 is retained at a first end by Velcro brand hook and loop fastner strap 871 and at a second end by strap 320. Hook 880 does not require cushioning foam 861, nor vice-versa, but in this alternative embodiment they are both provided and offer synergy therebetween.

In FIG. 8, while only tube guide 831 is illustrated as having cushioning foam 861 and Velcro brand hook and loop fastner strap 871, it will be understood that all or some of the tube guides 831–834 may be similarly fitted. In practice, the bicycle tube is placed into cushioning foam 861, and then Velcro brand hook and loop fastner strap 871 is wrapped around, retaining a bicycle in place without damage. Velcro brand hook and loop fastner strap 871 may pass around the exterior of tube guide 831 and may be riveted thereto, or may pass through small holes or slots formed in tube guide 831. The advantage of using rivets or small slots is that Velcro brand hook and loop fastner strap 871 will stay with tube guide 831, even when not in use.

Figure 9:
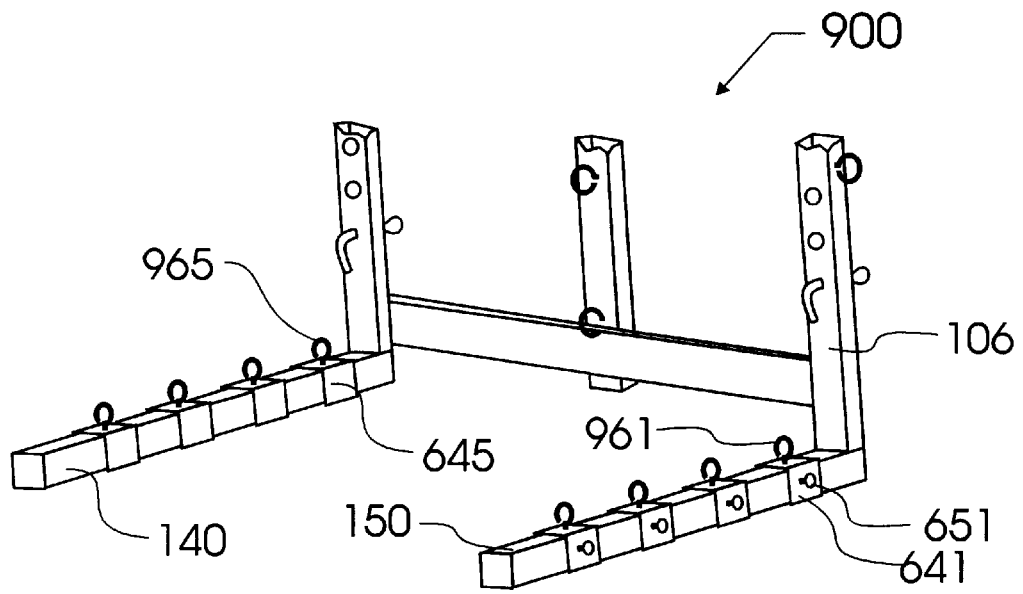

Adjustable slides 641–645 accommodate a wide variety of bicycles, but without additional support the bicycles will tend to bump against each other at their pedals and wheels during transport. To prevent such damage, and more securely anchor the bicycles, adjustable slides may also be used along bottom longitudinal struts 140 and 150. As shown in FIG. 9, these slides would preferably include attachment points 961 and 965, though any type of suitable anchor point would be acceptable. The use of slides on bicycle support 600 and on bicycle base support 900 ensures versatility while simultaneously providing better protection for the cargo. For multiple bicycles, bottom longitudinal struts 140 and 150 may be replaced by longer struts.

Figure 10:
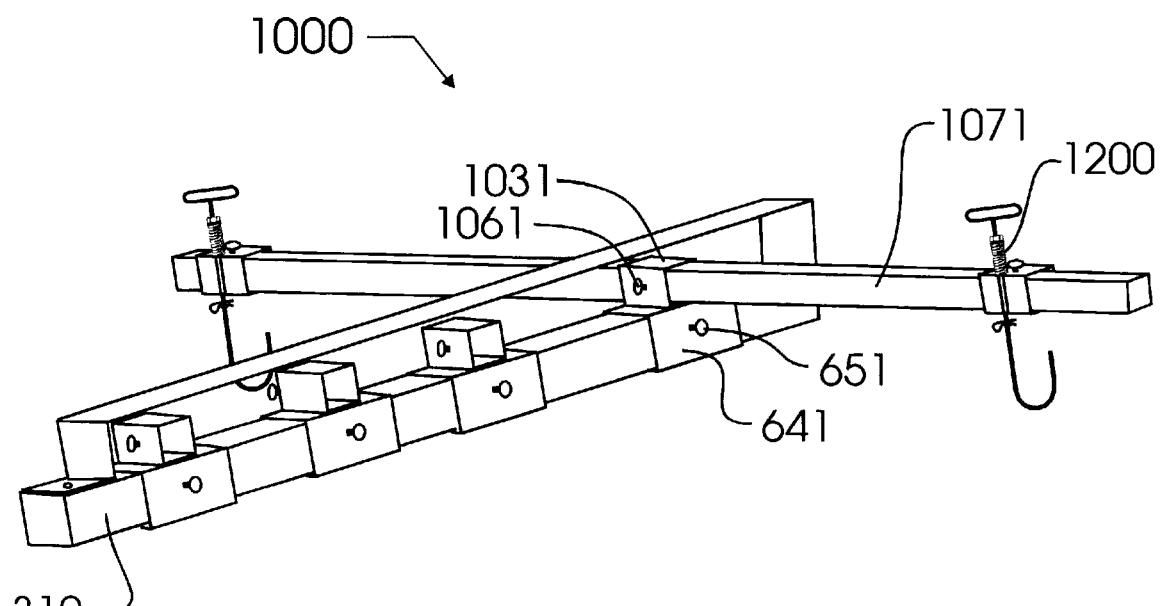
FIG. 10 illustrates by projected view a third embodiment of the bicycle carrier components of the preferred embodiment.

FIG. 10 illustrates another alternative embodiment carrier 1000. Longitudinal bicycle support strut 310 is used, and other like components shown in FIG. 3. However, as with the alternative bicycle supports 600 and 800, slide 641 and set screw 651 are provided. Instead of tube guides 331 or 831, a support tube 1031 is provided, which includes set screw 1061. Through support tube 1031 passes hanger rod 1071 which suspends spring-loaded hangers 1200 from either end. Spring-loaded hangers 1200 are illustrated in greater detail in FIGS. 12 and 13.

While carrier 1000 is desirably used with special bicycles, such as racing bicycles, which have no frame to hang the bicycle from. Tricycles, recumbent bicycles, child carriers and other special bicycles may also be carried, as well as a wide variety of non-transportation cargo. Furthermore, and as is by now apparent, so long as slides 641 are used, any combination of tube guides 331, 831 and supports 1031 may be simultaneously used on the same bicycle support strut 310. Any arrangement is possible, to suit the needs of the user.

Guides 331, 831 and supports 1031 are compact, and so may be readily stored in a small box or sack when not in use. Bicycle support strut 310 and associated hardware selected by the designer may be stored separately, but may preferably be used as a bicycle storage hanger. At the end of an outing, the support strut 310 may be removed from receiver 112 and hung from a similar receiver mounted upon or rigidly affixed to a wall. Alternatively, the entire carrier such as carrier 300 may be removed from vehicle receiver 50 and stood upon the ground. Due to the bottom longitudinal struts 140 and 150, carrier 300 is free standing when not in use with a vehicle. Rather than having to separately remove all of the cargo, the entire carrier 300 will act as a storage center, and be ready to transport for the next outing. This is a distinct advantage in the marketplace, since carriers typically detract from the aesthetic appearance of the vehicle and are desirably removed when not in use. Most prior art carriers are not free standing and must be disassembled at least partially during removal or after removal for storage. The cargo must be removed. To prepare for the next outing the entire process must be reversed. Carriers designed in accord with the present invention are simply slid off of the receiver hitch and stored, ready for re-use another time without any further disassembly or unpacking. Particularly for those persons seeking leisure, this is a distinct advantage.

FIG. 11 schematically illustrates a fifth alternative embodiment carrier 1100 of the invention, this time configured to carry cargo carrier 30, canoe paddle 60 and canoe 70. New to configuration 1100 is the extension of vertical struts 102 and 106 to act as a first support for roof-top carrier 1110, which is not illustrated in any detail, but which will be readily adapted from the prior art incorporated herein by reference. Also, while rods 146, 147 and 156, 157 are illustrated as carrying canoe paddles 60, bicycles may also, or alternatively, be carried therefrom.

Figures 12, 13:
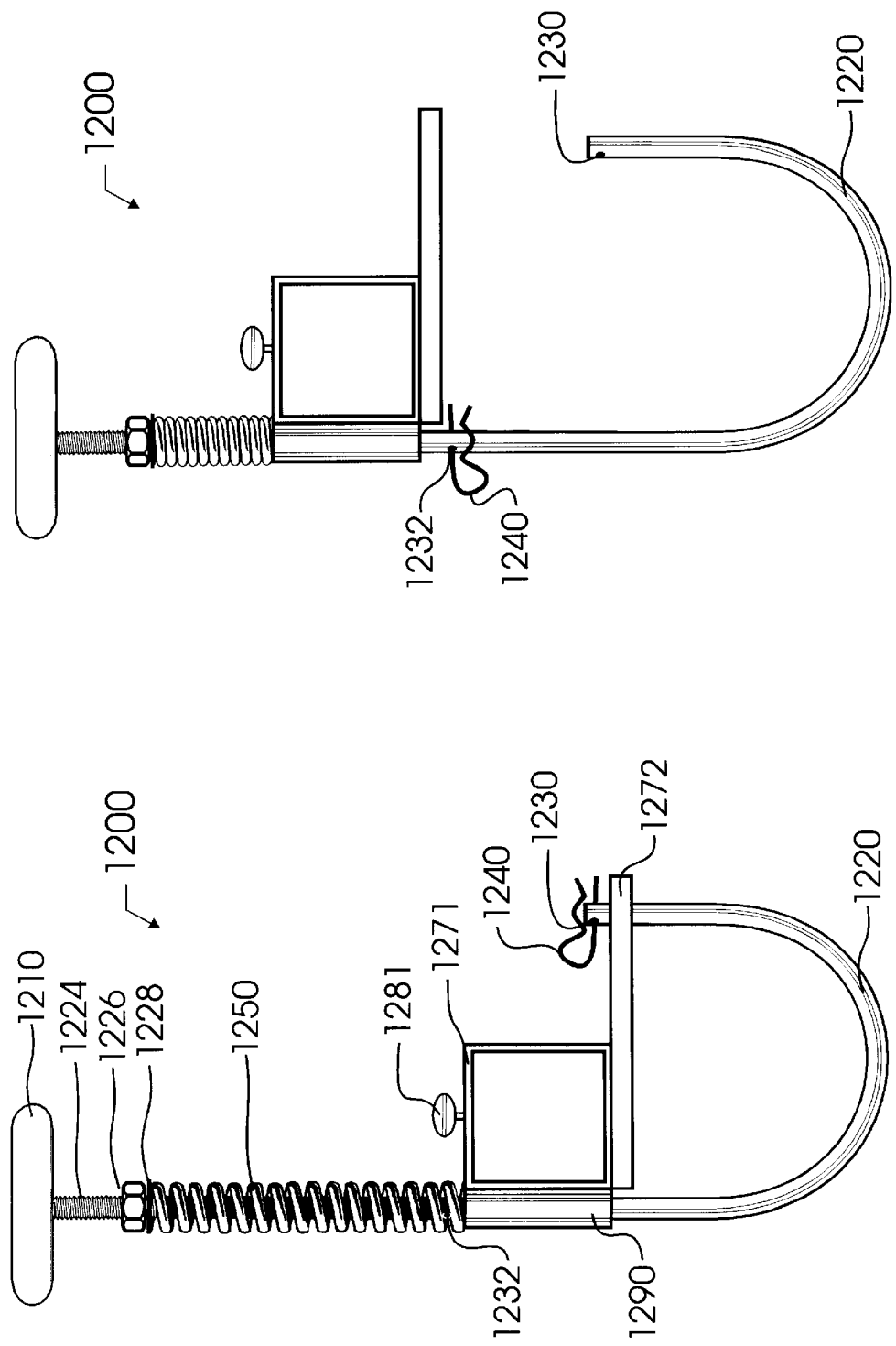
FIGS. 12 and 13 illustrate the bicycle tire hooks of FIG. 10 in greater detail.

FIGS. 12 and 13 illustrate spring loaded hanger 1200 in much greater detail, with FIG. 12 illustrating hanger 1200 in a closed position and FIG. 13 illustrating hanger 1200 in an open position. Spring 1250 is a compression spring, which, through washer 1228 and nut 1226, always applies upward pressure on the threading 1224 at a first end of support rod 1220. Nut 1226 is adjustable, to compensate for variances between springs and any aging of spring 1250 that might occur.

Rod 1220 carries cargo by suspension therefrom. To open rod 1220 to receive cargo, cotter pin 1240 must first be removed from hole 1230. Handle 1210 is then pressed down, thereby compressing spring 1250, and sliding hole 1232 from above guide tube 1290 as shown in FIG. 12, to below guide tube 1290 as shown in FIG. 13. Cotter pin 1240 is then inserted into hole 1232, to keep spring loaded hanger 1200 open during cargo loading. When in the closed position, cotter pin 1240 prevents support rod 1220 form dropping, even when sufficient force is otherwise applied, by interference with plate 1272. The entire hanger 1200 is supported upon hanger rod 1071 by tube 1271 and set screw 1281, which are similar in structure and function to adjustable slide 641 and set screw 651.

While the foregoing details what are felt to be the preferred embodiments of the invention, no material limitations to the scope of the claimed invention are intended. Further, features and design alternatives that would be obvious to one of ordinary skill in the art are considered to be incorporated herein. Specific materials, different arrangements of basic components illustrated herein, special coatings and other such deviations are taught by the present disclosure and deemed included herewith, even where not specifically recited. Known variations such as pivots at the junctures between vertical strut 104 and horizontal strut 110 or between vertical strut 106 and horizontal strut 104 which might, for example, allow the carrier 100 to be pivoted from transverse to vehicle 10 to longitudinal to vehicle 10 are well known and would be readily applied, by those of ordinary skill, to the present invention. Other variants such as bumper mountings and dual receiver hitches which are also known in the industry could also be applied to the present invention. The scope of the invention is set forth and particularly described in the claims hereinbelow.

I claim:

1. A trailer hitch carrier which can be attached to a motor vehicle trailer hitch receiver and supported thereon, comprising:

a carrier hitch insertable within said motor vehicle trailer hitch receiver;

a first vertical strut extending vertically from said carrier hitch and having tie points thereon;

a bicycle support strut having thereon means for supporting a plurality of bicycles;

a receiver for releasably receiving and supporting said bicycle support strut therein, said receiver mounted adjacent to said first vertical strut;

a first horizontal strut adjacent at a midpoint thereof to said first vertical strut but perpendicular thereto and transverse to said carrier hitch, said first horizontal strut having a plurality of holes therethrough and a first end and second end opposite each other from said midpoint;

a second vertical strut adjacent said first end of said first horizontal strut but perpendicular thereto, said second vertical strut having a plurality of holes therethrough;

a third vertical strut adjacent said second end of said first horizontal strut but perpendicular thereto, said third vertical strut having a plurality of holes therethrough; and a plurality of rods extending from some of said plurality of holes in said second and third vertical struts and repeatably removable therefrom.

2. The trailer hitch carrier of claim 1 further comprising:

a first horizontal framing strut removably attached at a first end to, and rotatable about, a top end of said second vertical strut and having a second end;

a second horizontal framing strut removably attached at a first end to a bottom end of said second vertical strut and having a second end;

a first vertical framing strut extending downward from said second end of said first horizontal framing strut to said second end of said second horizontal framing strut.

* * * * *